Figure 1:
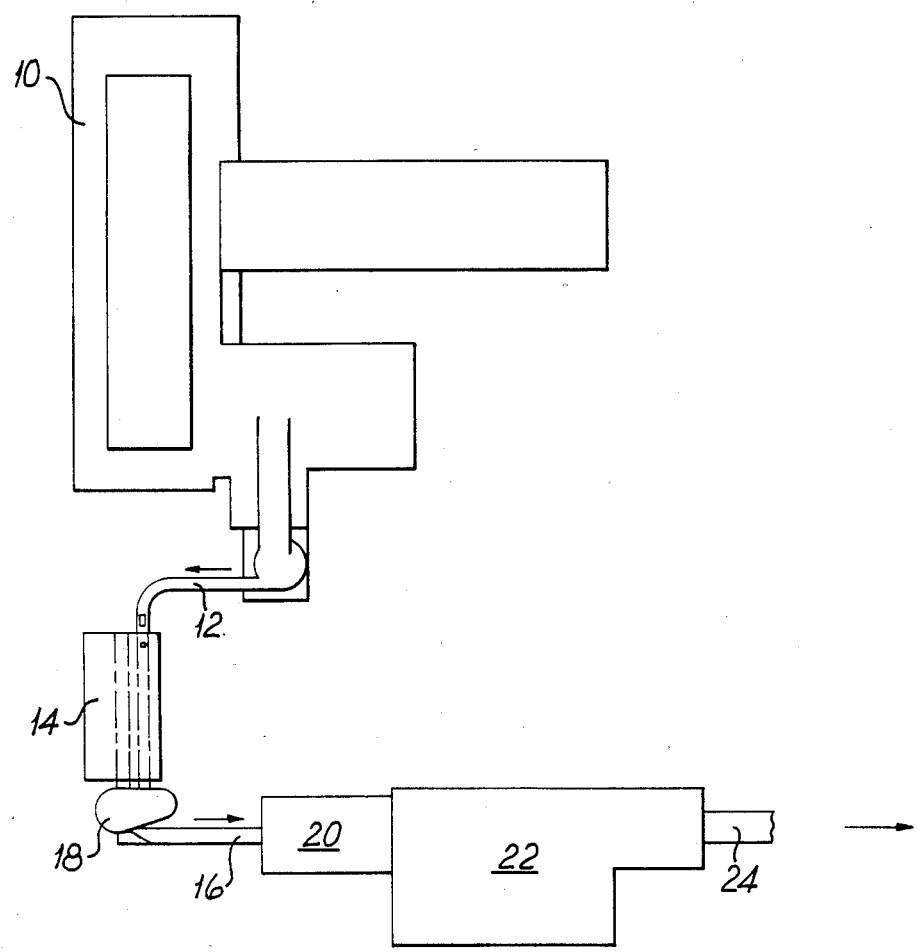

United States Patent [19]

Applegate et al.

[11] Patent Number: 4,560,057
[45] Date of Patent: Dec. 24, 1985

[54] PACKET HANDLING APPARATUS

[75] Inventors: Barry G. Applegate, London; David C. M. Carter; Frank Heybourn, both of Milton Keynes, all of England

[73] Assignee: Molins Limited, London, England

[21] Appl. No.: 323,481

[22] Filed: Nov. 20, 1981

[30] Foreign Application Priority Data

Nov. 21, 1980 [GB] United Kingdom ............... 8037442

[51] Int. Cl.<sup>4</sup> .............................................. B65G 1/00
[52] U.S. Cl. .................................. 198/347; 198/447; 198/410
[58] Field of Search ..................... 198/347, 410, 447

[56] References Cited

U.S. PATENT DOCUMENTS

| 3,340,992 | 9/1967 | Seragnoli | 198/347 |
| 3,532,387 | 10/1970 | Stancari | 198/347 |
| 3,754,632 | 8/1973 | Kreutter | 198/347 |
| 3,952,854 | 4/1976 | Selonke et al. | 198/347 |
| 3,976,190 | 8/1976 | Schmermund | 198/347 |
| 4,018,325 | 4/1977 | Rejsa | 198/347 |
| 4,240,538 | 12/1980 | Hawkes et al. | 198/447 |
| 4,274,530 | 6/1981 | Carter et al. | 198/347 |
| 4,383,600 | 5/1983 | Southerling et al. | 198/347 |
| 4,502,587 | 3/1985 | Clark | 198/347 |

FOREIGN PATENT DOCUMENTS

| 2640867 | 3/1977 | Fed. Rep. of Germany | 198/347 |
| 160534 | 6/1979 | Netherlands | 198/347 |
| 418959 | 2/1967 | Switzerland | 198/447 |
| 1434421 | 5/1976 | United Kingdom | 198/347 |

Primary Examiner—Joseph E. Valenza
Attorney, Agent, or Firm—Antonelli, Terry & Wands

[57] ABSTRACT

Packet handling apparatus, particularly for use between a cigarette packing machine and a cigarette packet wrapping machine, includes a main conveyor for moving packets towards a receiving station, and a reservoir for temporarily storing packets when the receiving station cannot accept the full supply from the conveyor. Packets are diverted from the main conveyor onto a secondary conveyor on which transfer to or from the reservoir occurs. The orientation of the packets is changed before loading into the reservoir so that the latter can receive batches of stacked packets. Packets are returned to the main conveyor at a position downstream of the position at which they were diverted, and returned packets have the same orientation as other packets on the main conveyor.

14 Claims, 9 Drawing Figures

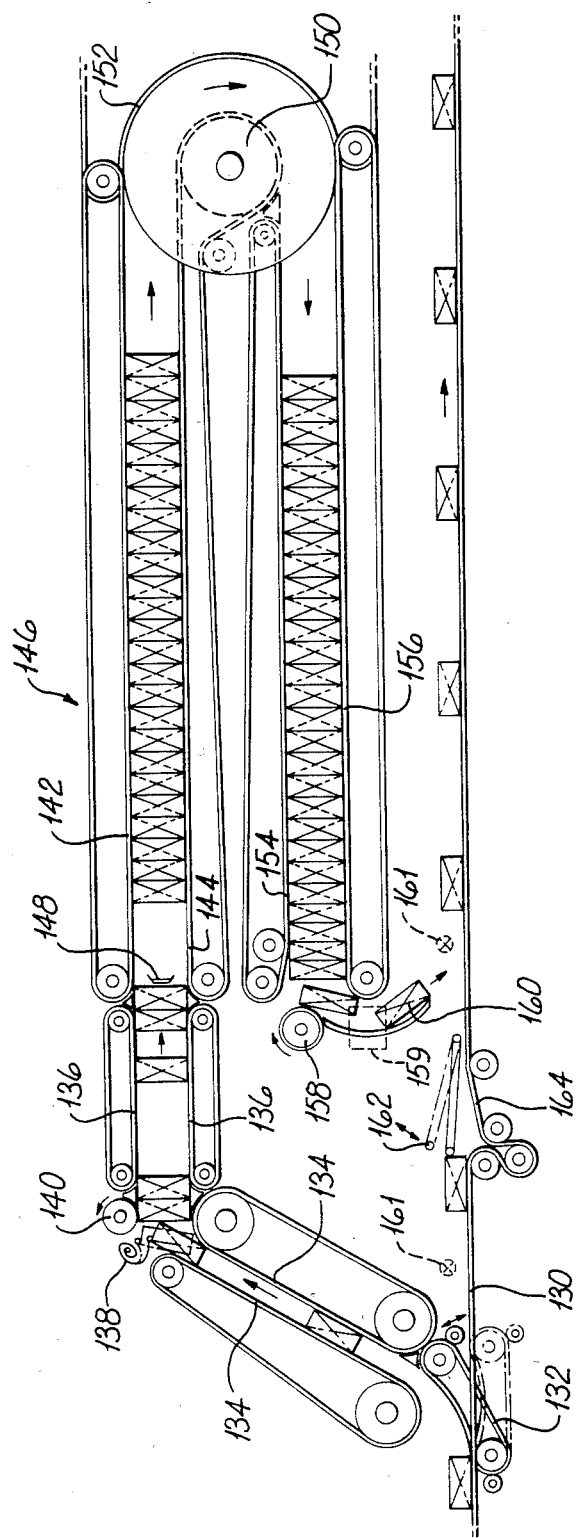

PACKET HANDLING APPARATUS

This invention is concerned with handling apparatus for packets, especially cigarette packets.

In the cigarette industry it is sometimes desirable to transfer packets between machines or parts of a machine which are operable independently. For example, packets may be transferred from a cigarette packing machine to a packet wrapping machine. In order to allow one machine or part of a machine to continue to operate when the other machine or part is temporarily out of action a reservoir or accumulator for packets may be provided to supply or receive packets as required. If, for example, a reservoir is positioned between a cigarette packing machine and a packet wrapping machine it can, for a limited period, receive packets from the packing machine when the wrapper is not working or supply packets to the wrapping machine when the packing machine is not working.

Packet handling apparatus including a packet reservoir is disclosed in British Patent Specifications Nos. 2 025 347 and 2 053 168, the disclosures of which are hereby incorporated herein in full.

According to the present invention a packet handling apparatus includes first conveyor means for moving a stream of spaced packets on a first path between a delivery station and a receiving station, means for diverting packets from the first path, second conveyor means for moving diverted packets on a second path, means for reorientating at least the packets on the second path to form a moving stack of abutting packets, means for transferring successive batches of stacked packets between the second path and a reservoir for storing packets, and means for returning packets from the second path to the first path at a position downstream of the diverting means, said packets being returned in the same direction as packets arriving at said position on said first path.

Preferably the returning means is arranged to return packets to the first path between packets already on the first path. Gate means may be provided to hold up packets on the first and/or second paths upstream of said position. The reorientating means may be arranged on said first path upstream of the diverting means. In one arrangement said first and second paths include substantially parallel portions along which packets are moved in stack formation. Preferably said first conveyor means includes means for receiving packets from said portion of said first path and from said portion of said second path in sequence. The diverting means may include means for moving a batch of stacked packets in a direction generally transverse to the conveyance direction on the first path and said second conveyor means may include means for moving a batch of stacked packets in a direction transverse to the length of the batch. A portion of said second conveyor means and said reservoir may be defined by an endless series of movable compartments for batches of stacked packets. The transferring means may be arranged so that packets are transferred to and from said reservoir at spaced positions on said second path.

The reorientating means may be arranged on said second path. The diverting means may include means for deflecting packets in line from said first path onto said second path. The reservoir may be located alongside said second path and may include means for receiving and storing a rectangular array of packets. The reservoir could comprise a mobile section, e.g. a conveyance or other mobile container for receiving packets, so that the capacity of the reservoir is not limited.

Packets are normally delivered by a packing machine as a spaced in-line stream and most wrapping machines are arranged to accept such a stream, and so it is desirable that packets should be conveyed in this configuration at least at the ends of the path between the packer and the wrapper; however it is more useful to store packets substantially upright on their ends as this provides a particularly compact form of storage. The present invention is capable of providing packet handling apparatus achieving these objects in combination.

Figure 2:
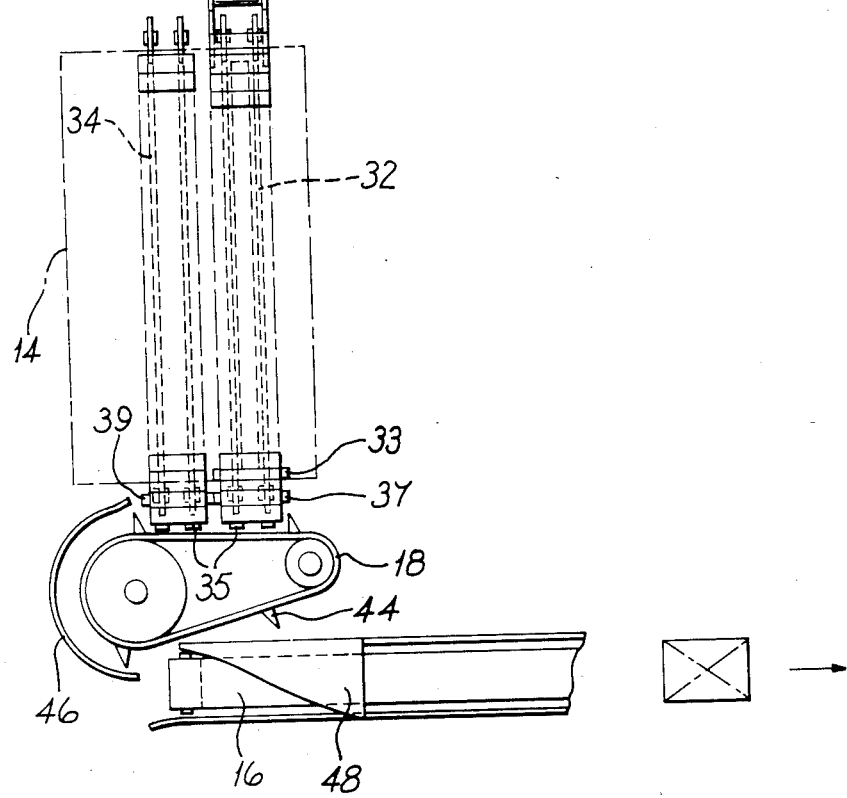
Figure 3:
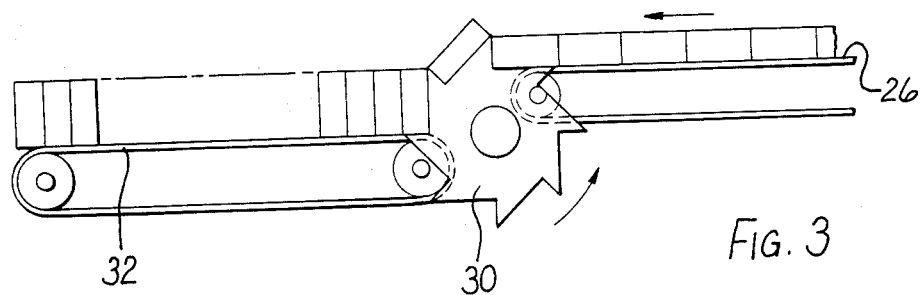
Figure 4:
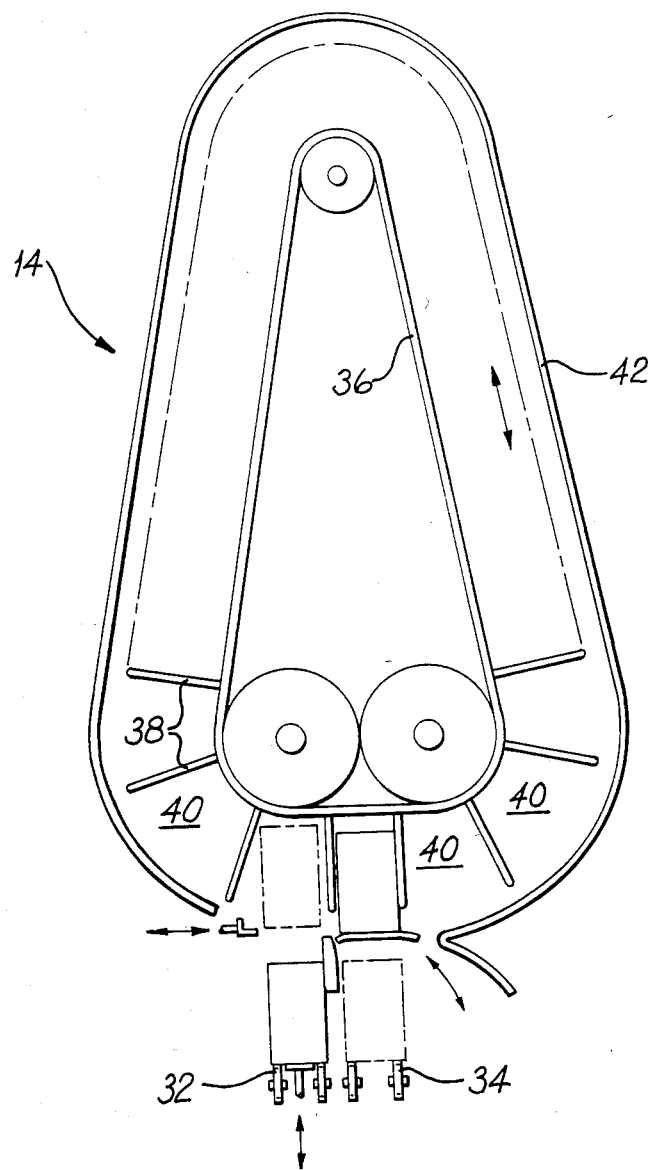
Figure 5:
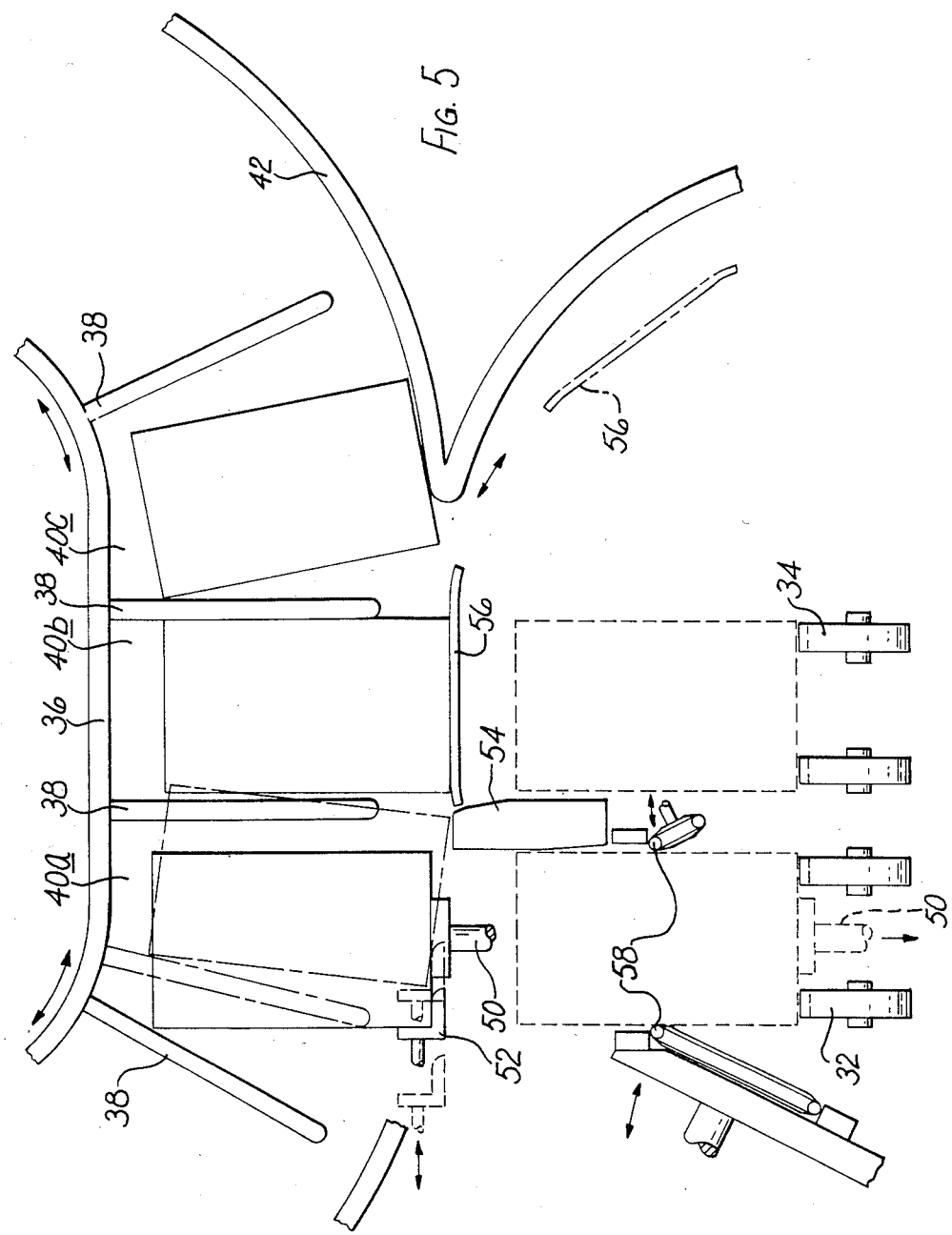
Figure 6:
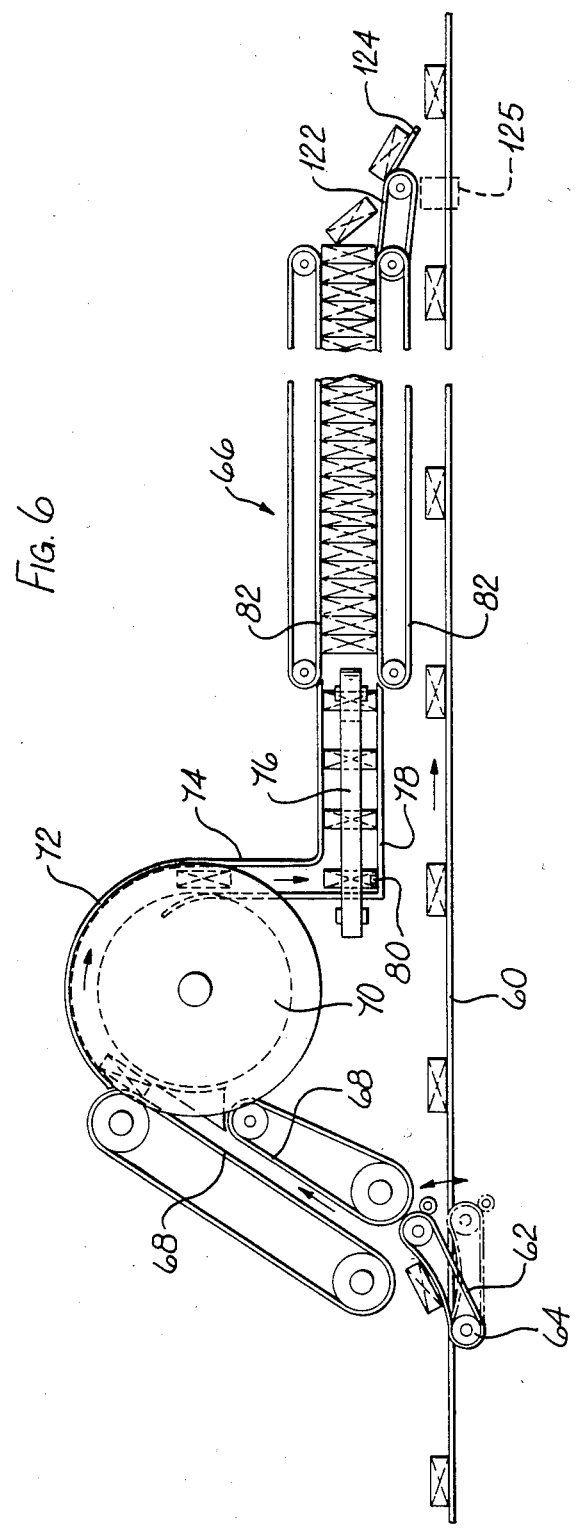
Figure 7:
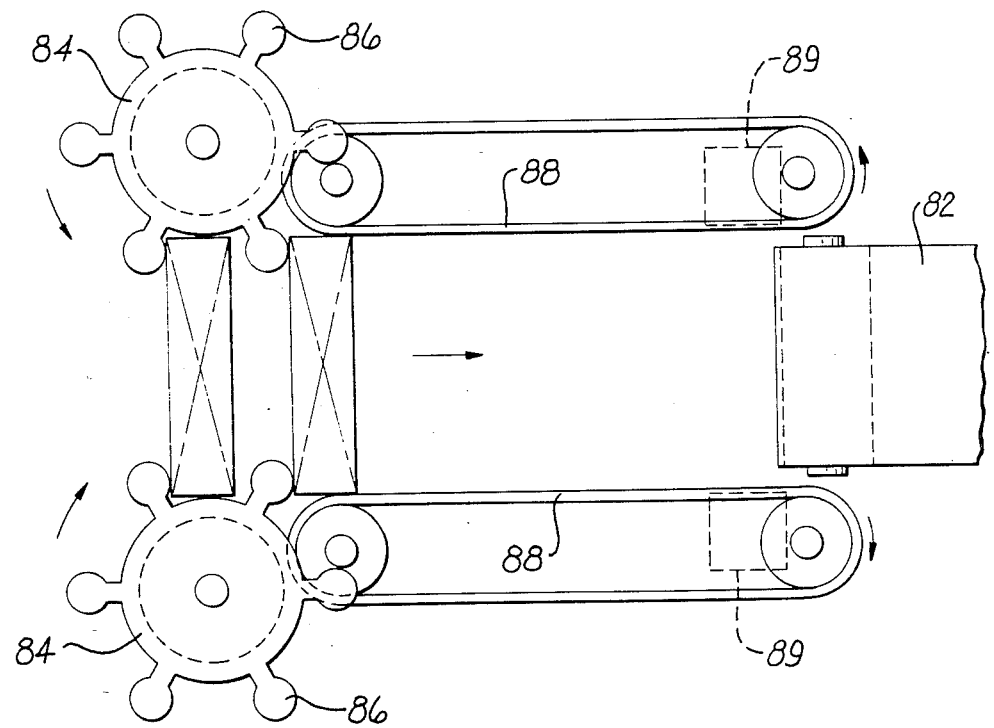
Figure 8:
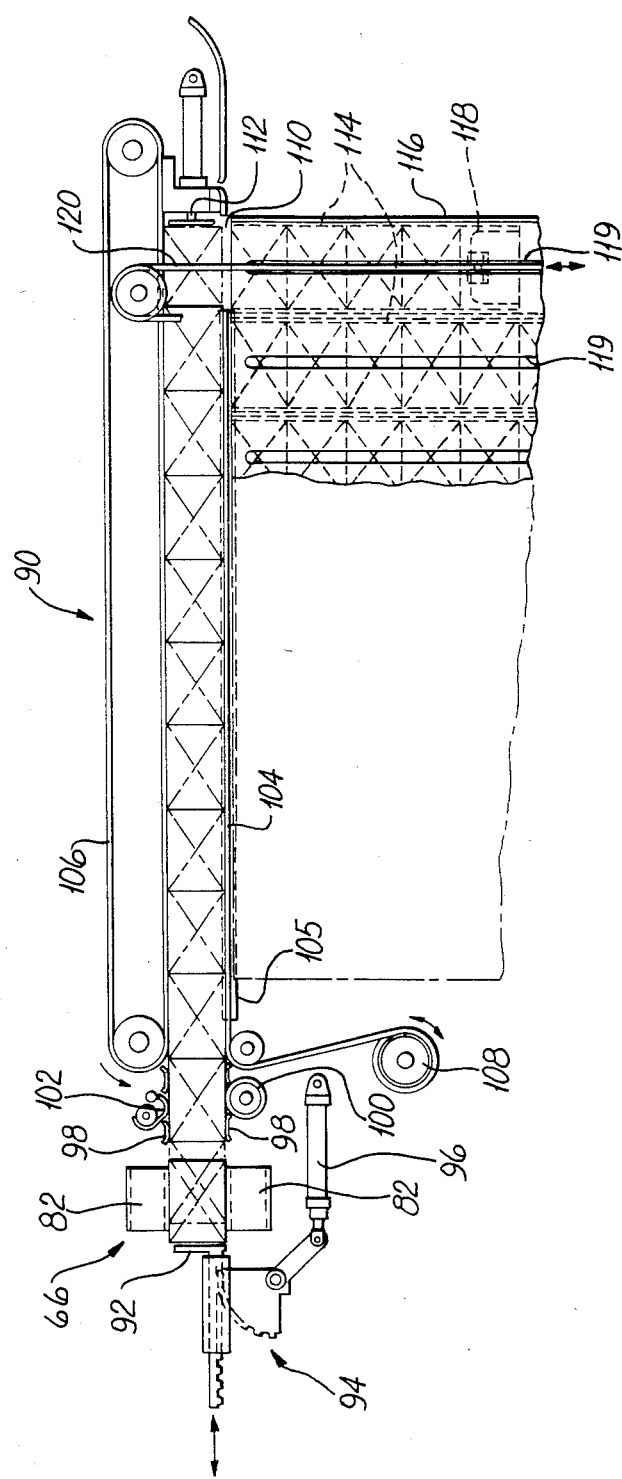

The invention will be further described, by way of example only, with reference to the accompanying diagrammatic drawings, in which:

FIG. 1 is a plan view of packet handling apparatus including a reservoir,

FIG. 2 is an enlarged plan view of the reservoir and adjacent parts of the apparatus of FIG. 1, FIG. 3 is a side view of a conveyor for moving packets towards the reservoir, FIG. 4 is an end view of the reservoir, FIG. 5 is an enlarged end view of part of the reservoir, FIG. 6 is a side view of another packet handling apparatus including a reservoir, FIG. 7 is a plan view of a modified conveyor for use with the apparatus of FIG. 6, FIG. 8 is an end view of the apparatus of FIG. 6 showing the reservoir, and FIG. 9 is a side view of further packet handling apparatus including a reservoir.

FIG. 1 shows packet handling apparatus including a cigarette packing machine 10 which delivers cigarette packets to an output conveyor 12. Packets from the conveyor 12 are delivered to or past a reservoir 14 and subsequently to an output conveyor 16 via an output control belt 18. The conveyor 16 leads to a unit 20 for placing revenue stamps on the packets and a wrapping machine 22 for overwrapping each packet with transparent plastics material. Overwrapped packets are delivered on a further conveyor 24.

Referring now also to FIG. 2, a conveyor band 26 is arranged at right angles to the conveyor 12 adjacent its downstream end. Curved guides 28 direct packets from the conveyor 12 to the conveyor 26 at a transition between the conveyors. An input control star wheel 30, shown also in FIG. 3, receives a line of packets on their large faces from the conveyor 26 and delivers them on their end faces to a main reservoir conveyor 32. A reservoir exit conveyor 34 is arranged adjacent and parallel to the conveyor 32. Each of the conveyors 32 and 34 comprises laterally spaced parallel bands and may support a line of adjacent packets on their end faces. As shown in FIG. 4 the packet reservoir 14 is arranged above the conveyors 32 and 34 and comprises at least two laterally spaced endless bands 36 (only one of which is shown) provided with spaced partitions 38 at least partly defining compartments 40. An outer guide 42 partly surrounds the bands 36 and partitions 38. The reservoir 14 and, more particularly, the partitions 38, extend along a substantial part of the lengths of the conveyors 32 and 34.

As shown in FIG. 2 the output control belt 18 is arranged adjacent the ends of conveyors 32 and 34 and is provided with abutments 44 for receiving packets from the conveyor 32 and/or 34 and delivering them by means including a curved guide 46 onto the output conveyor band 16. An output plough 48 is provided for turning onto their large faces packets received on their ends on the conveyor 16.

When the packing machine 10 and wrapping machine 22 are operating normally packets are conveyed between the machines by way of conveyors 12, 26, 30, 32, 18 and 16. The packets on conveyor 32 pass below the reservoir 14. If the packing machine 10 is delivering more packets than the wrapping machine 22 can accept, e.g. due to a wrapping machine fault, the packing machine may continue to operate, packets being supplied to the reservoir 14. Alternatively, if the packing machine 10 fails the wrapper may continue to wrap packets delivered from the reservoir 14 until the latter is empty. Delivery of packets to the reservoir and removal of packets from the reservoir is described below with particular reference to FIG. 5.

When it is required to load packets into the reservoir 14 the conveyor 32 is stopped as soon as a complete line or batch of abutting packets has accumulated on the conveyor. This may be indicated by photosensors for example. Instead of stopping the conveyor 32 gate means 33 could be operated to stop the batch by stopping the leading packets. A movable platform 50 arranged between the laterally spaced bands comprising the conveyor 32 is then moved upwards to lift the batch of packets into an empty compartment 40a in the reservoir 14, i.e. into the position shown in full lines in FIG. 5. A laterally moving L-shaped plunger 52 is advanced from one side and engages beneath a corner of the batch of packets in the compartment 40a and supports the batch, allowing the platform 50 to be lowered to its original position between the bands of conveyor 32. The plunger 52 is then advanced further, to the position shown in chain-dot lines in FIG. 5, until the side of the batch opposite the plunger is lightly clamped against the opposite divider 38. Subsequently, when the reservoir band 36 is indexed, so that the dividers 38 shown in FIG. 5 move to the right, the batch of packets tilts as the divider plate supporting one side moves away. Tilting of the batch stops when the lower corner of the batch engages, the upper surface of a stationary support member 54. Subsequently the batch is moved by engagement of the next divider plate 38 with the side of the batch adjacent the plunger 52 and the batch is swept onto a platform 56, so that it occupies the position shown in compartment 40b in FIG. 5. The plunger 52 is retracted to its original position. By allowing the batch to tilt the side of the batch engaged and moved by the upstream divider plate 38 is more nearly parallel to the divider plate when contact is made.

If loading of the reservoir 14 is to continue, as soon as another batch of packets has assembled on the conveyor 32 it is lifted as before into the next empty compartment moved into the position of compartment 40a and subsequently moved into the platform 56. The first batch now occupying the position of compartment 40b is moved into the position of compartment 40c in FIG. 5 and partially supported by the guide 42. Loading of the reservoir 14 may continue in this way with intermittent movement of the conveyor 36 in an anti-clockwise direction (as viewed in FIG. 5) until the reservoir is full, e.g. with all compartments 40 occupied by a batch of packets. This condition may be indicated by a photosensor or the like associated with the last compartment to be filled and, if required, a signal may be generated to stop the packing machine 10 if the wrapping machine 22 is still incapable of receiving packets.

Unloading of batches of packets onto the conveyor 34 occurs only when there are not packets already on the conveyor 34. Assuming this condition (indicated by photosensors or the like) exists, unloading takes place by retraction of the platform 56 to the position shown in chain-dot lines in FIG. 5 to allow a batch of packets in the compartment 40b to fall onto the conveyor 34. When the conveyor 34 has removed this batch from the reservoir 14 further batches are successively and intermittently delivered to the conveyor 34 by clock-wise movement of the reservoir band 36 (as viewed in FIG. 5) to sweep batches from the position occupied by compartment 40c adjacent the end of guide 42 so that they fall onto the conveyor 34. The support 54 acts as a guide for the leading side of each batch as it falls and the pushing divider plate 38 guides the trailing side. The gap between the guide 42 and the support 54 is such that the batch will fall through the gap with no risk of pinching between the advancing divider plate 38 and the support. If necessary additional guide means opposite the support 54 and beneath the guide 42 could be provided. Lowering means similar to the platform 50 could, if necessary, be provided so that the batch descends under control onto the conveyor 34. A lowering platform could comprise a modified form of the platform 56 which lowers the batch at least part of the way onto the conveyor 34 before being retracted. Batches of packets may continue to be unloaded until the reservoir 14 is empty. If the packing machine 10 is still unable to supply packets once the reservoir 14 is empty the wrapping machine 22 may be stopped automatically once the last packets from the reservoir 14 have been wrapped.

The conveyors 32 and 34 are operable independently to deliver packets to the output control belt 18. Single packets may be removed from the end of conveyor 32 or 34 by the abutments 44 of belt 18 and delivered onto the conveyor 16. As soon as one packet is removed from the conveyor 32 or 34 by the belt 18 the conveyor (which normally moves continuously) will move the next packet forward for engagement by the next abutment 44. The packets may be delivered from both conveyors 32 and 34 at the same time. Thus, if the reservoir 14 has just delivered a batch of packets onto the conveyor 34 and the packing machine 10 starts delivering packets to the conveyor 32 the output control belt 18 may remove packets from both conveyors, an abutment 44 initially removing a packet from the conveyor 32 which packet in turn removes a packet from the conveyor 34. Unloading the reservoir 14 at the same time as delivering packets from the packing machine 10 on the conveyor 32 may be desirable, particularly when the reservoir is more than about half full, to ensure that the reservoir has sufficient capacity to receive packets from the packing machine if the wrapping machine 22 breaks down. When the output control belt 18 is delivering packets from both conveyors 32 and 34 it may run at a slower speed than normal so that the wrapping machine 22 can continue to work at its normal rate; alternatively the speed of the wrapping machine may be automatically increased to cope with the higher rate of delivery of packets.

At the end of each conveyor 32 and 34 stop means 35 (below the path of abutments 44) are provided to stop the line of packets with the leading packet in position ready for lateral displacement by the belt 18. When the line of packets is stopped on the conveyor 32 or 34 by such stop means 35 the conveyor continues to run underneath the line of packets and when the leading packet is removed by the belt 18 the whole line of packets is advanced by the conveyor so that the next packet in line is positioned ready for subsequent removal by the belt 18. In some circumstances it may be preferred to provide output gate means associated with one or both of the conveyors 32 and 34, such gate means being synchronised with movement of the abutments 44 of the control belt 18. Thus, gate means 37 and 39 may be used to hold up the line of packets on the conveyors 32 and 34 respectively but to release a packet for conveyance into the path of an abutment 44 of the control belt 18 as and when required. This arrangement might be used, for example, where it is required to supply packets alternately from the conveyors 32 and 34. Suitable gate means for holding up packets on a continuously moving belt conveyor are disclosed in British Patent Specification No. 2 025 347, to which reference is directed for further details.

Packets conveyed on their end faces on the conveyor 32 may be unstable, especially at or near the end of a line or batch of packets. Additional side control belts 58 (FIG. 5) may be provided, travelling at the same speed as the conveyor 32 and lightly engaging the side faces of the packets. The belts 58 (and the associated running gear) may be retracted, as indicated by arrows in FIG. 5, to allow lifting of a batch of packets by the platform 50. Similar belts could be provided alongside the conveyor 34.

In the apparatus of FIG. 6 a belt conveyor 60 conveys packets from a cigarette packing machine (not shown) towards a packet wrapping machine (not shown). When the packing machine and wrapping machine are running normally packets are conveyed on the conveyor 60 without interruption. A driven endless belt 62, pivoted about a pulley 64, is arranged below the line of conveyor 60 in such normal operation (as indicated in chain-dot lines in FIG. 6) but may be raised, to divert packets upwards towards a loading/unloading position 66 at which packets may be loaded into a reservoir (90, FIG. 8), in the event that the wrapping machine is unable to accept packets delivered by the packing machine.

The diverting belt 62, which may for example be arranged between laterally spaced belts of the conveyor 60, diverts packets from the conveyor 60 to an inclined elevator comprising spaced upper and lower belts 68. A rotatable drum 70 having a rubber or other resilient gripping surface cooperates with a coaxial guide surface 72 to convey packets from the belt 68 to a vertical chute 74. At the bottom of the chute 74 opposed spaced side belts 76 provided with inwardly-directed abutments engage each upright packet and convey it on a surface 78 towards the loading position 66. The side belts 76 may be driven intermittently in predetermined steps and be activated by a sensor 80 which detects when a packet has reached the bottom of the chute 74. Beyond the belts 76 upper and lower belts 82, moving more slowly than the belts 76, grip the packets top and bottom and assemble a batch of abutting upright packets in the loading position 66.

An alternative to the side belts 76 is shown in FIG. 7. A pair of wheels 84 provided with circumferentially spaced projections 86 is arranged at the bottom of the chute 74 and conveys packets towards opposed plain side bands 88 leading to the belts 82. The wheels 84 may be rotated intermittently, in response to packets descending the chute 74, but the bands 88 may move continuously.

Referring now also to FIG. 8, which is an end view of the loading/unloading position 66, when the space between belts 82 is substantially full (and contains 25 packets in abutment) the belts are momentarily stopped and the batch of packets pushed laterally from between the belts to a reservoir 90. A pusher 92, operated by a rack mechanism 94 and air cylinder 96, is provided for moving the batch of packets from the belts 82. Immediately after the batch has been removed the pusher 92 is retracted, allowing another batch to start forming between the belts 82.

During the short period while the belts 82 are stationary the bands 76 are stopped. Any packets still being delivered from the drum 70 during this short period may accumulate in the chute 74 and can be cleared as soon as the bands 76 and 82 start again. With the arrangement of FIG. 7 the wheels 84 and side bands 88 may continue while the belts 82 are stopped. The bands 88 are unable to move packets beyond the batch of packets held between the belts 82 and so merely slip until the belts 82 start again. If necessary, however, gate means 89 could be provided at the entrance to the belts 82 to prevent any possible forward movement of packets when the belts are stopped. The gate means may comprise any convenient means as disclosed in British Patent Specification No. 2 025 347 or may comprise opposed grippers lightly clamping a packet at the entrance to the belts 82.

The first batch of packets transferred from the belts 82 into the reservoir 90 is received between surfaces 98 and lightly clamped into contact with a lower drive roller 100 by a spring 102. As subsequent batches are transferred by the pusher 92 the batches are moved laterally in abutment and received between a drivable flexible strip 104 and an upper band 106. The batches may be pushed over the surface of the strip 104 or, preferably, the latter and the band 106 are intermittently driven in synchronism with the pusher 92. The strip 104 extends from a winding reel 108 and is supported at its sides beneath the band 106 in horizontal channels 105.

When the strip 104 has reached its position of furthest extension (as shown in FIG. 8) and if it is still required to load packets into the reservoir 90, packets are delivered through a downward opening 110 between the end of the strip 104 and an unloading pusher 112. Beneath the opening 110 is a vertical compartment 114 of a movable reservoir 116. Each compartment 114 has a captive vertically-movable platform 118 engageable (through slots 119 in the sides of the reservoir 116) with a vertical drive band 120 (forming part of the reservoir 90). As batches of packets are advanced into the reservoir 90 the drive band 120 is indexed to successively lower the platform 118 under the opening 110 so that leading batches successively descend through the opening into the compartment 114 below. When a compartment 114 is filled the mobile reservoir 116 is indexed to position the next empty compartment under the opening 110; the captive platform 118 is preferably maintained at the top of an empty compartment so that the drive band 120 can immediately engage it and start receiving batches.

When a mobile reservoir 116 is full another reservoir can be moved into place with a compartment 114 beneath the opening 110. The mobile reservoir 116 may comprise a trolley or other conveyance. The arrangement may be substantially similar to that provided for rod-like articles in British Patent Specification No. 2 035 248; in particular, the loading/unloading position 66 (or reservoir 90) may be used to deliver batches of packets to or receive batches from another packet handling apparatus having a similar loading/unloading position (or reservoir).

When it is required to unload batches of packets from a mobile reservoir 116 the bands 120 are intermittently driven to raise the platform 118 in the compartment below the opening 110 so that batches are delivered into the path of the plunger 112 above the opening. Batches are successively pushed by the plunger 112 onto the end of the strip 104. As batches of packets on the strip 104 are advanced back towards the belt 82 the band 106 may also be moved in this direction but the strip remains stationary, the batches of packets sliding over it. The leading batch of packets is driven from the strip 104 into the loading/unloading position 66 between the belts 82 by means of the roller 100. It will be appreciated that an unload sequence will not operate if any packets are between the belts 82 in the path of a batch returning from the reservoir 90. Sensor means may be provided to detect this condition and, as mentioned earlier, gate means 89 may be provided to ensure that no packets are advanced beyond the entrance to the belts 82.

After a batch of packets returned from the reservoir 90 has been cleared by the belts 82 another batch can be unloaded and so on. If unloading continues until the mobile reservoir 116 is empty or if otherwise it is not desired to feed batches of packets into the path of the pusher 112, unloading may continue by retraction of the strip 104 (and simultaneous movement of the band 106) until there are not packets in the reservoir 90.

As shown in FIG. 6 packets conveyed by the belts 82 after the unloading are received on an inclined band 122, which moves at a higher speed than the belts 82 so that packets are tipped back onto their large faces, and slide down a ramp 124 onto the main conveyor 60 to the wrapping machine. The orientation of packets delivered from the reservoir 90 is the same as that of packets delivered straight along the conveyor 60. In order to prevent interference between packets delivered from the unloading position 66 and those passing direct from the packing machine on conveyor 60 a gate 125 may be provided on the conveyor just upstream of the ramp 124 to temporarily hold up packets on the conveyor while unloading is taking place. The gate may be of any convenient type described in British Patent Specification No. 2 025 347 or may be of the type disclosed at 162, 164 in FIG. 9 and described below.

If conditions at the wrapping machine change after diverting packets by means of the belt 62 but before any packets are transferred to the reservoir 90 those packets can pass straight through the position 66 to be returned to the conveyor 60.

FIG. 9 shows a packet handling apparatus which is rather similar to that of FIG. 6. A main conveyor 130 conveys packets from a cigarette packing machine to a cigarette wrapping machine. A pivotable diverting band 132 is provided for diverting packets, when required, to elevator bands 134. At the upper ends of the elevator bands 134 a stack of packets is formed directly between upper and lower driven bands 136. A spring 138 and small upper driven roll 140 cooperate with the lower band 134 to form the stack. The bands 136 deliver the stack between a further pair of bands 142, 144 which correspond with the bands 82 of the apparatus of FIG. 6 and which define a loading/unloading position 146.

The apparatus associated with the loading/unloading position 146 may be identical with that shown in FIG. 8. Gate means 148 (which may be of any convenient type) is provided at the entrance to the bands 142, 144.

Beyond the loading/unloading position 146 the band 144 passes around a large drum 150. A band 152 is guided around the outer periphery of the drum 150 and spaced from it by the height of a packet so that with the band 144 a curved path for packets is formed leading to a lower pair of bands 154, 156. At the end of the bands 154, 156 a driven roll 158 and curved slide 160 lead back onto the conveyor 130. The path by way of the loading/unloading position 146 is such that packets travelling on this path are returned to the conveyor 130 in the same orientation as when they left it.

A gate is provided just upstream of the slide 160 and comprises a pivoted cranked arm 162 projectable into the path of packets on the conveyor 130. The conveyor 130 is deflected beneath the gate to provide a depression including an inclined conveyor portion 164. This arrangement avoids the need for sensing the position of packets on the conveyor 130 when operating the gate. If the arm 162 descends whilst a packet is passing it is merely deflected beneath the arm into the portion 164 whereas the next packet in line is stopped by the gate, as indicated in FIG. 9. Alternatively, or additionally, gate 159 could be provided to stop packets on the slide 160 until packets on the conveyor 130 have passed; sensors 161 could indicate this, for example. A similar arrangement could be provided at the slide 124 in the FIG. 6 arrangement.

An alternative or additional loading/unloading position could be provided between the bands 154 and 156.

We claim:

1. Packet handling apparatus including a delivery station; a receiving station; first conveyor means for moving a stream of spaced packets on a first path between said stations; means for selectively diverting stacked packets in parallel as a batch from said first path to a second path, said first and second paths including first and second side-by-side, substantially parallel path portions, respectively, along which packets are moved in series in stack formation; means for reorientating at least the packets on the second path to form a moving stack of abutting packets, said reorientating means being arranged to turn successive packets to that the length of said stack of abutting packets is minimized in the direction of movement of said stack, said reorientating means being arranged on said first path upstream of the diverting means; a reservoir disposed above said first and second parallel path portions of said first and said second paths for storing packets diverted from said first path by said diverting means; second conveyor means for carrying successive batches of stacked packets along said second path portion of said second path; dispensing means for dispensing packets from said reservoir onto said second conveyor means; and means for returning packets carried in series from said second conveyor means to said first path at a position downstream of the diverting means with the same orientation as packets arriving at said position on said first path, said position at which packets are returned from said second path to said first path being upstream of said receiving station so that a substantial length of said first path is available for receiving packets from said first path upstream of said position and from said second path.

2. Packet handling apparatus as claimed in claim 1, including gate means for holding up packets on the first path upstream of said position.

3. Packet handling apparatus as claimed in claim 2, including gate means for holding up packets on the second path upstream of said position.

4. Packet handling apparatus as claimed in claim 1, wherein said first conveyor means includes combining means in operative association with said second conveyor means for receiving packets from said second path portion of said second path in sequence.

5. Packet handling apparatus as claimed in claim 4, wherein said combining means comprises means for transferring packets alternatively from said first conveyor means and said second conveyor means at said position on said first path in a direction transverse to said parallel first and second path portions.

6. Packet handling apparatus as claimed in claim 1, wherein said second conveyor means includes a conveyor portion disposed between said position on said first path portion of said first path and said reservoir for conveying packets in series in stack formation along said second path portion of said second path which is parallel to said first path portion of said first path and said dispensing means includes means for transferring packets in parallel at batches from said reservoir along said second path and onto said conveyor portion.

7. Packet handling apparatus as claimed in claim 1, wherein said first conveyor means includes means at said position for pushing packets in a direction transverse to the direction in which packets are received from said first and second path portions of said first and second paths.

8. Packet handling apparatus as claimed in claim 1, wherein said diverting means includes means for moving a batch of packets as a unit in a direction transverse to the length of the batch.

9. Packet handling apparatus as claimed in claim 1, wherein said diverting means comprises a packet moving member movable in a direction generally transverse to the direction of movement of packets on the first path.

10. Packet handling apparatus as claimed in claim 9, wherein the packet moving member is arranged to move a batch of packets as a unit in a direction transverse to the length of the batch.

11. An article handling apparatus including an article delivery station; an article receiving station; first conveyor means for moving a stream of articles on a first path extending between said delivery station and said receiving station; second conveyor means disposed side-by-side and in parallel with a portion of said first conveyor means for moving articles in series; a reservoir disposed in operative relationship with said first and second conveyor means for storing articles, including means forming article storage compartments moveable along a second path, at least a portion of which extends transversely above said first and second conveyor means; diverting means for selectively diverting articles transversely from said first conveyor means into said reservoir; dispensing means for selectively dispensing articles from said reservoir onto said second conveyor means; and means for merging articles on said second conveyor means with articles on said first conveyor means downstream of said reservoir.

12. An article handling apparatus according to claim 11, wherein said articles are packets carried from said article delivery station on said first conveyor means as a single layer stream of packets in a flat condition, and further including means located upstream of said portion of said first conveyor means which is parallel to said second conveyor means for orienting the packets to form a moving stack of abutting packets with the packets of the stack having an upright orientation.

13. An article handling apparatus as claimed in claim 12, wherein the diverting means includes means for moving a batch of stacked packets in a direction generally transverse to the conveyance direction on said first path.

14. An article handling apparatus according to claim 12, wherein said dispensing means includes means for transferring a batch of stacked packets from said reservoir to said second conveyor means.

* * * * *